United States Patent
Chen

(10) Patent No.: US 10,499,699 B2
(45) Date of Patent: Dec. 10, 2019

(54) INTERLOCKING METHOD AND INTERLOCKING DEVICE FOR SHARED BICYCLE AND INTELLIGENT SAFETY HELMET

(71) Applicant: Dongguan University of Technology, Guangdong (CN)

(72) Inventor: Baiman Chen, Guangdong (CN)

(73) Assignee: Dongguan University of Technology, Guangdong (CN)

( * ) Notice: Subject to any disclaimer, the term of this patent is extended or adjusted under 35 U.S.C. 154(b) by 0 days.

(21) Appl. No.: 16/121,549

(22) Filed: Sep. 4, 2018

(65) Prior Publication Data
US 2019/0082764 A1    Mar. 21, 2019

(30) Foreign Application Priority Data
Sep. 15, 2017  (CN) .......................... 2017 1 0833338

(51) Int. Cl.
    *A42B 3/04*     (2006.01)
    *G06K 7/14*     (2006.01)
    (Continued)

(52) U.S. Cl.
    CPC .......... *A42B 3/0413* (2013.01); *A42B 3/0466* (2013.01); *B62H 5/00* (2013.01);
    (Continued)

(58) Field of Classification Search
    CPC ... A42B 3/04; G06K 7/14; G07C 9/00; B62H 5/00; B62J 99/00; B62J 11/00; E05B 47/06; A63B 24/00; A63B 71/00
    (Continued)

(56) References Cited

U.S. PATENT DOCUMENTS 4,982,452 A * 1/1991 Chaise ................. A42B 3/0466
                                                     2/410
8,899,366 B2 * 12/2014 Yao .......................... B62M 6/45
                                                     180/167
(Continued)

FOREIGN PATENT DOCUMENTS

CN          106490750         3/2017

*Primary Examiner* — Nam V Nguyen
(74) *Attorney, Agent, or Firm* — JCIPRNET

(57) ABSTRACT

The present invention discloses a method for interlocking a shared bicycle and an intelligent safety helmet, and the method comprises the following steps: (1) providing an electronic frame lock and an intelligent safety helmet for using cooperatively on a shared bicycle respectively, interlocking both of them when the shared bicycle is parked; (2) checking the current state information of an electric lock and a safety helmet lock simultaneously when a user uses the mobile intelligent terminal to scan the shared bicycle; (3) unlocking of the electric lock and the safety helmet lock when the verification is passed; (4) wearing an intelligent safety helmet before using the bicycle; (5) beginning to record the trip information by the intelligent helmet after the user puts on the intelligent safety helmet; (6) stopping the voice broadcast function and terminating the recording of the trip information when the state information of the electronic frame lock and the safety helmet lock which is checked shows that the electronic frame lock and the safety helmet lock are locked, after the user terminates the using of the bike. The invention also discloses an interlocking device for a shared bicycle and an intelligent safety helmet implementing the above-mentioned method, which makes that the bicycle and the intelligent safety helmet are always in a state that they are used in cooperation with each other.

13 Claims, 5 Drawing Sheets

(51) Int. Cl.
*G07C 9/00* (2006.01)
*B62H 5/00* (2006.01)
*B62J 11/00* (2006.01)
*E05B 47/06* (2006.01)
*B62J 99/00* (2009.01)
*A42B 3/06* (2006.01)

(52) U.S. Cl.
CPC ............. *B62J 11/005* (2013.01); *B62J 99/00* (2013.01); *E05B 47/06* (2013.01); *G06K 7/1417* (2013.01); *G07C 9/00309* (2013.01); *G07C 9/00571* (2013.01); *A42B 3/066* (2013.01); *B62J 2099/004* (2013.01)

(58) Field of Classification Search
USPC ......... 340/5.61, 5.6; 482/4, 8; 180/167, 220, 180/65.1
See application file for complete search history.

(56) References Cited

U.S. PATENT DOCUMENTS

| | | | |
|---|---|---|---|
| 8,930,054 B2* | 1/2015 | Garcia | B62M 6/45 |
| | | | 701/22 |
| 2009/0181826 A1* | 7/2009 | Turner | B62M 6/50 |
| | | | 482/4 |
| 2016/0083034 A1* | 3/2016 | St-Gallay | B62J 11/005 |
| | | | 224/412 |
| 2017/0114572 A1* | 4/2017 | Reda | A42B 3/0413 |

* cited by examiner

INTERLOCKING METHOD AND INTERLOCKING DEVICE FOR SHARED BICYCLE AND INTELLIGENT SAFETY HELMET

CROSS-REFERENCE TO RELATED APPLICATION

This application claims the priority benefit of China design patent application serial no. 201710833338.9, filed on Sep. 15, 2017. The entirety of the above-mentioned patent application is hereby incorporated by reference herein and made a part of the specification.

TECHNICAL FIELD

The present invention relates to the technical field of riding equipment and in particular, to an interlocking method and an interlocking device for a shared bicycle and an intelligent safety helmet.

BACKGROUND

With the advancement of society and the continuous improvement of science and technology, people's transportation methods and means of transport have also been rapidly developed. Bicycles are essential means of transport for people to travel on short distances. However, many traffic accidents may occur when riding a bicycle. Relevant data shows that in more than 500 cases of bicycle deaths each year, 75% of deaths are due to fatal injuries to the head. Medical studies have found that wearing a helmet when riding a bicycle can prevent 85% of head injuries and greatly reduce the degree of damage and the rate of accidental death. Therefore, it is extremely important to wear a helmet when riding a bicycle. However, because there are no relevant laws and regulations stipulating that riders must wear helmets before they can hit the road, people's awareness of riding a bicycle is weak.

With the acceleration of urbanization, the construction of urban public transport and the development of ride-hailing service still have not met people's diversified travel needs. With the advent of shared bicycles, the advantages of shared bicycles in the segmented field of short-distance travel have been recognized to some extent. Because shared bicycles are new things under the economic model, they lack a variety of ancillary products and equipment. The lack of security support ancillary equipment is one of them. Therefore, after a large number of shared bicycles appear, the issues about how to protect the user's riding safety need to be solved. Therefore, it is necessary to improve and perfect the riding ancillary products and equipment for sharing bicycles so as to meet people's safety when riding.

The Chinese invention application No. 201610541929.4 discloses a multifunctional intelligent riding safety helmet and a working method thereof. The helmet comprises a helmet body, a camera unit, a voice control and processing unit, an intelligent main board, a display unit and a wireless communication unit; the unit being provided on an outer side of the helmet body and being connected with the intelligent main board; the display unit being connected to a lower end of the helmet through a bracket and being connected with the intelligent main board; the wireless communication unit being provided inside the interior of the helmet body and being connected with the intelligent main board; the intelligent main board being provided inside the interior of the helmet body. The method comprises the followings: photographing the landscape and transmitting the image by the camera unit to the intelligent main board for saving; controlling the display unit to display the image by the intelligent main board; connecting the intelligent main body with the mobile terminal by the wireless communication unit and importing an address book of the mobile terminal into the intelligent main board by the wireless communication unit, it is controlled through the voice control and processing unit to accomplish the dialing function.

The above-mentioned helmet has safety, communication and reminding functions, and can be used independently from the bicycle when in use, but cannot be used to synchronously lock the bicycle and cannot achieve the purpose of prompting the user to wear a helmet and then to unlock a bicycle and start riding either.

SUMMARY OF THE INVENTION

In view of the above-mentioned shortcomings of the prior art, the object of the present invention is to provide an interlocking method for a shared bicycle and an intelligent safety helmet, so as to solve the problem that the existing shared bicycle is not equipped with a safety helmet. When the shared bicycle is parked, the intelligent safety helmet and the electronic frame lock are locked simultaneously and are interlocked, and the intelligent safety helmet is locked on the shared bicycle. When the user obtains the use authorization, both of them are unlocked simultaneously, and the user is prompted to put on the helmet first before using the bicycle, thereby ensuring that the user can conveniently obtain the helmet and the bicycle at the same time before riding and that the user must wear a helmet to guarantee the safety of riding.

The present invention also provides an interlocking device for a shared bicycle and an intelligent safety helmet for achieving the above method, so as to solve the problem of equipping a safety helmet for a shared bicycle synchronously and solving the problem for the anti-theft of helmet; it has a compact structure, reasonable design and is convenient to be used.

To achieve the above-mentioned object, the present invention adopts the following technical solutions:

an interlocking method for a shared bicycle and an intelligent safety helmet, comprises the following steps:

(1) providing an electronic frame lock and an intelligent safety helmet which are used cooperatively on a shared bicycle respectively, and providing a processor and an electric lock inside the electronic frame lock; providing a safety helmet lock and a voice prompt device on the intelligent safety helmet; interlocking the electric lock with the intelligent safety helmet when the shared bicycle is parked;

(2) when a user uses a mobile intelligent terminal to scan a two-dimensional code of the shared bicycle, establishing a communication link between the mobile intelligent terminal and the electronic frame lock and issuing an use authorization request by the mobile intelligent terminal, verifying the authorization request of the user by the processor inside the electronic frame lock through the network, and simultaneously checking the current state information of the electric lock and the safety helmet lock by the processor inside the electronic frame lock;

(3) when the verification of the authorization request of the user is passed and when both the electronic frame lock and the safety helmet lock are in a locked state, issuing an instruction by the processor to unlock the electric lock and the safety helmet lock simultaneously;

(4) after the safety helmet lock is unlocked, triggering the voice prompt device on the intelligent safety helmet to prompt the user in form of voice broadcast that the intelligent safety helmet has been unlocked and to prompt the user in form of voice broadcast to put on the intelligent safety helmet;

(5) after the user puts on the intelligent safety helmet, triggering a voice prompt switch such that the voice prompting device stops the voice broadcast function, and the intelligent safety helmet begins to record a trip information;

(6) after the user terminates the using of the bicycle, prompting the user by the voice prompt device in the intelligent safety helmet to lock the electronic frame lock and the safety helmet lock respectively, when the state information of the electronic frame lock and the safety helmet lock checked by the processor inside the electronic frame lock shows that the electronic frame lock and the safety helmet lock are locked, stopping the voice broadcast function and terminating the recording of the trip information.

The step (3) further comprises the following steps:

(3.1) when the electronic frame lock is locked and the safety helmet lock is unlocked, determining by the processor that the state information of the electronic frame lock and the safety helmet lock is in an abnormal state, issuing a language prompt by the voice prompt device to prompt the user to lock the safety helmet lock first, returning to step (2) to reissue the use authorization request;

(3.2) when the electronic frame lock is unlocked and the safety helmet lock is locked, determining by the processor that the state information of the electronic frame lock and the safety helmet lock is in an abnormal state, issuing the language prompt by the voice prompt device to prompt the user to lock the electronic frame lock first, returning to step (2) to reissue the use authorization request;

(3.3) when both the electronic frame lock and the safety helmet lock are unlocked, determining by the processor that the state information of the electronic frame lock and the safety helmet lock is in an abnormal state, issuing the language prompt by the voice prompt device to prompt the user to lock the safety helmet lock and electronic frame lock first, returning to step (2) to reissue the use authorization request.

The step (4) further comprises the following steps: when the user takes off the intelligent safety helmet during the process of bicycling, retriggering the voice broadcast function of the voice prompt device and issuing a voice to prompt the user to put on the intelligent safety helmet when bicycling.

The step (1) further comprises the following steps:

(11) providing the intelligent safety helmet with a safety helmet lock plug assembly and a safety helmet lock slot; providing the intelligent safety helmet on a bicycle saddle, and fixing a rear end of the intelligent safety helmet on the bicycle saddle by the cooperation between the safety helmet lock plug assembly and the safety helmet lock slot; or:

(12) providing a Y-shaped support frame on a front end of a handlebar of and a rear end of the saddle of the shared bicycle, and fixing the rear end of the intelligent safety helmet on the handlebar of or the saddle of shared bicycle by the cooperation between the safety helmet lock plug assembly and the safety helmet lock slot.

An interlocking device for a shared bicycle and an intelligent safety helmet implementing the method, comprises:

an electronic frame lock and an intelligent safety helmet which are respectively provided on a shared bicycle and used in cooperation with each other, a processor and an electric lock being provided inside the electronic frame lock;

the intelligent safety helmet being used for interlocking with the bicycle and for protecting the safety of a user while bicycling, the intelligent safety helmet being provided with a safety helmet lock and a voice prompt device;

the electric lock being used for locking the bicycle, an internal circuit of the electric lock being connected to the processor by the connection with the interior of a helmet lock plug;

the electric lock and the safety helmet lock being interlocked when the shared bicycle is parked, and being unlocked simultaneously when the shared bicycle is used.

The interlocking device for the shared bicycle and the intelligent safety helmet, wherein the device further comprises a safety helmet lock slot provided on the shared bicycle and a safety helmet lock plug assembly provided on the intelligent safety helmet, the safety helmet lock slot and the safety helmet lock plug assembly being used in cooperation with the safety helmet lock for locking the intelligent safety helmet on the shared bicycle to prevent theft and for interlocking with the electric lock when the shared bicycle is parked.

The intelligent safety helmet is provided on the bicycle saddle, the rear end of the intelligent safety helmet being fixed on the bicycle saddle by the cooperation between the safety helmet lock plug assembly and the safety helmet lock slot; or a front end of a handlebar of and a rear end of the saddle of the shared bicycle are provided with a Y-shaped support frame, and the rear end of the intelligent safety helmet is fixed on the handlebar of or the saddle of shared bicycle by the cooperation between the safety helmet lock plug assembly and the safety helmet lock slot; and the safety helmet lock plug assembly is electrically connected with the processor inside the electronic frame lock and a main control circuit of the electric lock through a wire or wireless communication, so as to achieve interlocking.

The safety helmet lock plug assembly comprises a safety helmet lock plug, a first bracket, a first rotation shaft, a second bracket and a second rotation shaft, the safety helmet lock plug being connected with the first bracket through the first rotation shaft, the first bracket being connected with the second bracket through the second rotation shaft, the safety helmet lock plug comprising an input and output data interface plug, a locking pin, a first spring, a first lever, a locking button, a travel switch, a second lever, a second spring, an electromagnet, a ferromagnetic metal sheet, and a shell, the input and output data interface plug being provided on an upper end of the shell, the shell being provided with a first insertion hole and a second insertion hole, the locking pin being movably provided inside the first insertion hole, the locking button being movably provided inside the second insertion hole, the first spring being sleeved on the locking pin, one end of the first spring being fixed at one side of a cap of the locking pin, the other end of the first spring being fixed on an inner wall of the shell, a top of the cap of the locking pin being fixed at one end of the first lever, the other end of the first lever being fixed at one end of the locking button, the travel switch being fixed on the inner wall of the shell and is located directly above the locking button, the locking button being provided with a notch, the electromagnet is fixed on the inner wall of the shell, the ferromagnetic metal sheet being provided at one end of the second lever and is located directly below the electromagnet, the other end of the second lever being fixed on the inner wall of the shell, one end of the second spring being fixed on the inner wall of the shell, the other end of the second spring being fixed on the second lever, the electromagnet being electrically connected with a main control circuit of the electronic frame lock through a wire.

The safety helmet lock slot comprises a locking pin hole, an input and output data interface slot provided on one side of the locking pin hole, and a built-in control circuit, the input and output data interface slot being electrically connected with the built-in control circuit.

The intelligent safety helmet is further provided with a film pressure sensor; wherein when the intelligent safety helmet is removed from the helmet lock plug, the built-in voice prompt device prompts; when the user puts on the intelligent safety helmet, an action switch of the film pressure sensor in the intelligent safety helmet is triggered by the intelligent safety helmet's own weight, such that the voice prompt device is controlled by the control circuit on the intelligent safety helmet to stop the prompt; when the intelligent safety helmet is taken off, the action of the pressure sensor disappears such that the voice prompt device is controlled by the control circuit on the intelligent safety helmet to issue the prompt; and after the intelligent safety helmet is inserted into the helmet lock plug, the main control circuit inside the electronic frame lock stops the voice prompt device inside the intelligent safety helmet from prompting through an input and output data interface.

The present invention has following advantages:

The method and the locking device provided by the present invention can guarantee, by technical means, the riding safety of the user who uses the shared bicycle, and share the processor and the control circuit, which is simple, feasible, and is convenient for promotion. The invention provides a method and an interlocking device for a riding helmet matched and interlocking with a shared bicycle, which is specifically composed of a helmet, a helmet internal alarm device and a processor thereof, a control circuit, a helmet lock plug and an electronic frame lock. When the shared bicycle is not in use, the helmet is locked on the bicycle, and the lock plug of the locked helmet is controlled by the processor and the control circuit inside the frame lock to be simultaneously locked and interlocked; only when the helmet, the helmet lock plug and the electronic frame lock are simultaneously unlocked, can the shared bicycle be used. These three constitute a whole device which prompts or forces the user of the shared bicycle start riding after putting on the safety helmet, which can protect the user's head to reduce the damage during the process of riding.

The present invention adopts the structural design of the interlocking safety helmet, such that the bicycle and the safety helmet are always in a state of mutual matching use or coexistence, and that the user can directly obtain the safety helmet when using the shared bicycle. And during riding, the helmet must be worn to guarantee the safety of the use of the bicycle, and at the same time, the interlocking of the two also guarantees the safety of the helmet itself, avoiding it from being lost or stolen.

The present invention adopts a voice prompting manner to prompts and guides the user to put on a safety helmet, and improves the safety of the user's use of the bicycle by technical means.

The present invention adopts the structural design that the safety helmet lock plug of the safety helmet lock mutually cooperates with the safety helmet lock slot, such that the safety helmet can be locked on the shared bicycle, thereby achieving the object that it is used by matching with the shared bicycle. When improving the safety of the riding of the user, the user does not need to prepare the user's own safety helmet, which is convenient for the user to travel and also prevents the risk of the helmet being stolen or lost.

In order to explain the structural features and functions of the present invention more clearly, it is further described with reference to the accompanying drawings and the specific embodiment of present invention.

DETAILED DESCRIPTION OF THE PREFERRED EMBODIMENT

Figure 1:
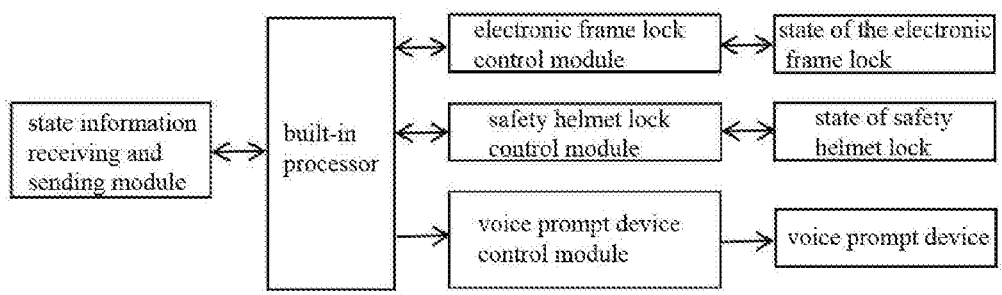
FIG. 1 is a schematic view of component modules of the present invention.
Figure 2:
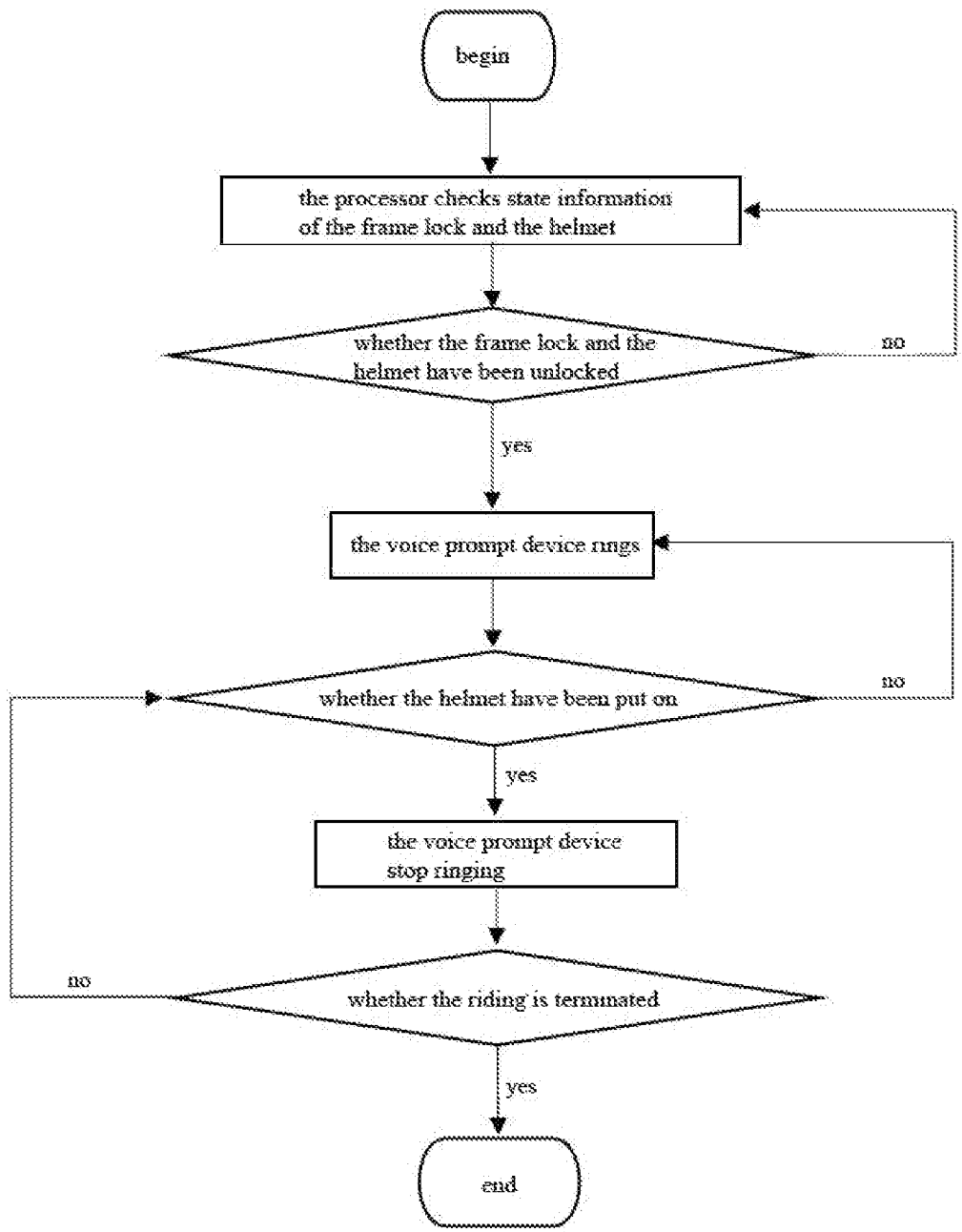
FIG. 2 is a flow chart of an interlocking method of the present invention.

The present invention is further described with reference to the accompanying drawings of the specific embodiment of present invention. Apparently, the described embodiments are merely a part of but not all of the embodiments of the present invention. All other embodiments obtained by those skilled in the art based on the embodiments of the present invention without creative efforts shall fall within the protection scope of the present invention.

Referring to FIG. 1 to FIG. 5, the present embodiment provides an interlocking method for a shared bicycle and an intelligent safety helmet, which comprises the following steps:

(1) providing an electronic frame lock and an intelligent safety helmet which are used cooperatively on a shared bicycle respectively, and providing a processor and an electric lock inside the electronic frame lock; providing the electric lock with a built-in control module, the control module comprising a main control circuit; providing a safety helmet lock 1 and a voice prompt device (inside with a language prompt control module is provided) on the intelligent safety helmet; interlocking the electric lock with the intelligent safety helmet when the shared bicycle is parked; and the processor may also be provided inside the intelligent safety helmet, providing the safety helmet lock 1 with a built-in safety helmet lock control module for controlling the action of the safety helmet lock;

the electronic frame lock and the intelligent safety helmet being both provided with a wireless communication module, i.e. a lock state information receiving and sending module, for interactive communication and network remote communication;

(11) providing the intelligent safety helmet with a safety helmet lock plug assembly 2 and a safety helmet lock slot 3; providing the intelligent safety helmet on a bicycle saddle, and fixing a rear end of the intelligent safety helmet on the bicycle saddle by the cooperation between the safety helmet lock plug assembly 2 and the safety helmet lock slot 3; or:

(12) providing a Y-shaped support frame on a front end of a handlebar of and a rear end of the saddle of the shared bicycle, and fixing the rear end of the intelligent safety helmet on the handlebar of or the saddle of shared bicycle by the cooperation between the safety helmet lock plug assembly 2 and the safety helmet lock slot 3;

(2) when a user uses a mobile intelligent terminal (such as a smartphone) to scan a two-dimensional code of the shared bicycle or the shared bicycle's ID information which is in other forms, establishing a communication link between the mobile intelligent terminal and the electronic frame lock and issuing an use authorization request by the mobile intelligent terminal, verifying the authorization request of the user by the processor inside the electronic frame lock through the network, and simultaneously checking the current state information of the electric lock and the safety helmet lock 1 by the processor inside the electronic frame lock;

(3) when the verification of the authorization request of the user is passed and when both the electronic frame lock and the safety helmet lock 1 are in a locked state, issuing an instruction by the processor to unlock the electric lock and the safety helmet lock 1 simultaneously;

(3.1) when the electronic frame lock is locked and the safety helmet lock 1 is unlocked, determining by the processor that the state information of the electronic frame lock and the safety helmet lock 1 is in an abnormal state, issuing a language prompt by the voice prompt device to prompt the user to lock the safety helmet lock 1 first, returning to step (2) to reissue the use authorization request;

(3.2) when the electronic frame lock is unlocked and the safety helmet lock 1 is locked, determining by the processor that the state information of the electronic frame lock and the safety helmet lock 1 is in an abnormal state, issuing the voice prompt by the voice prompt device to prompt the user to lock the electronic frame lock first, returning to step (2) to reissue the use authorization request;

(3.3) when both the electronic frame lock and the safety helmet lock 1 are unlocked, determining by the processor that the state information of the electronic frame lock and the safety helmet lock 1 is in an abnormal state, issuing the voice prompt by the voice prompt device to prompt the user to lock the safety helmet lock 1 and electronic frame lock first, returning to step (2) to reissue the use authorization request;

(4) after the safety helmet lock 1 is unlocked, triggering the voice prompt device (language prompt control module) on the intelligent safety helmet to prompt the user in form of voice broadcast that the intelligent safety helmet has been unlocked and to prompt the user in form of voice broadcast to put on the intelligent safety helmet;

when the user takes off the intelligent safety helmet during the process of bicycling, retriggering the voice broadcast function of the voice prompt device and issuing a voice to prompt the user to put on the intelligent safety helmet when bicycling;

(5) after the user puts on the intelligent safety helmet, triggering a voice prompt switch such that the voice prompting device stops the voice broadcast function, and the intelligent safety helmet begins to record a trip information, and/or begins to billing;

(6) after the user terminates the using of the bicycle, prompting the user by the voice prompt device in the intelligent safety helmet to lock the electronic frame lock and the safety helmet lock 1 respectively, when the state information of the electronic frame lock and the safety helmet lock 1 checked by the processor inside the electronic frame lock shows that the electronic frame lock and the safety helmet lock 1 are locked, stopping the voice broadcast function, and terminating the recording of the trip information and/or stopping billing;

wherein the safety helmet lock 1, through the safety helmet lock plug assembly 2 provided on the shared bicycle and the safety helmet lock slot 3 provided on the intelligent safety helmet body, is used for locking the intelligent safety helmet on a shared bicycle and used by matching with the bicycle, and prevents theft at the same time; and the electronic frame lock provided on the shared bicycle, which is used for locking the bicycle, comprises a main control circuit of the electronic frame lock, which is used for communicating with the processor and controlling the unlocking actions of the safety helmet lock slot 1 and the safety helmet lock plug assembly 2.

An interlocking device for a shared bicycle and an intelligent safety helmet implementing the above-mentioned method, comprises:

an electronic frame lock and an intelligent safety helmet which are respectively provided on a shared bicycle and used in cooperation with each other, and a processor (i.e., a built-in processor) and an electric lock being provided inside the electronic frame lock;

the intelligent safety helmet being used for interlocking with the bicycle and protecting the safety of a user while bicycling, the intelligent safety helmet being provided with a safety helmet lock 1 and a voice prompt device;

the electric lock being used for locking the bicycle, an internal main control circuit of the electric lock being connected to the processor by the connection with an internal control module of the helmet lock 1;

the electric lock and the safety helmet lock being interlocked when the shared bicycle is parked, and being unlocked simultaneously when the shared bicycle is used.

The interlocking device for the shared bicycle and the intelligent safety helmet further comprises a safety helmet lock slot 3 provided on the shared bicycle and a safety helmet lock plug assembly 2 provided on the intelligent safety helmet, the safety helmet lock slot 3 and the safety helmet lock plug assembly 2 being used in cooperation with the safety helmet lock 1 for locking the intelligent safety helmet on the shared bicycle to prevent theft and for interlocking with the electric lock when the shared bicycle is parked.

The intelligent safety helmet is provided on the bicycle saddle, the rear end of the intelligent safety helmet being fixed on the bicycle saddle by the cooperation between the safety helmet lock plug assembly 2 and the safety helmet lock slot 3; or the front end of the handlebar of and the rear end of the saddle of the shared bicycle are provided with a Y-shaped support frame, and the rear end of the intelligent safety helmet is fixed on the handlebar of or the saddle of shared bicycle by the cooperation between the safety helmet lock plug assembly and the safety helmet lock slot.

The safety helmet lock plug assembly 2 is electrically connected with a processor on the electronic frame lock and a main control circuit of the electric lock through a wire or a wireless communication module, so as to achieve interlocking; and the helmet lock slot 3 is electrically connected with the processor and the voice prompt device inside the intelligent safety helmet through a wire or a wireless communication module (such as Bluetooth, etc.).

Figure 3:
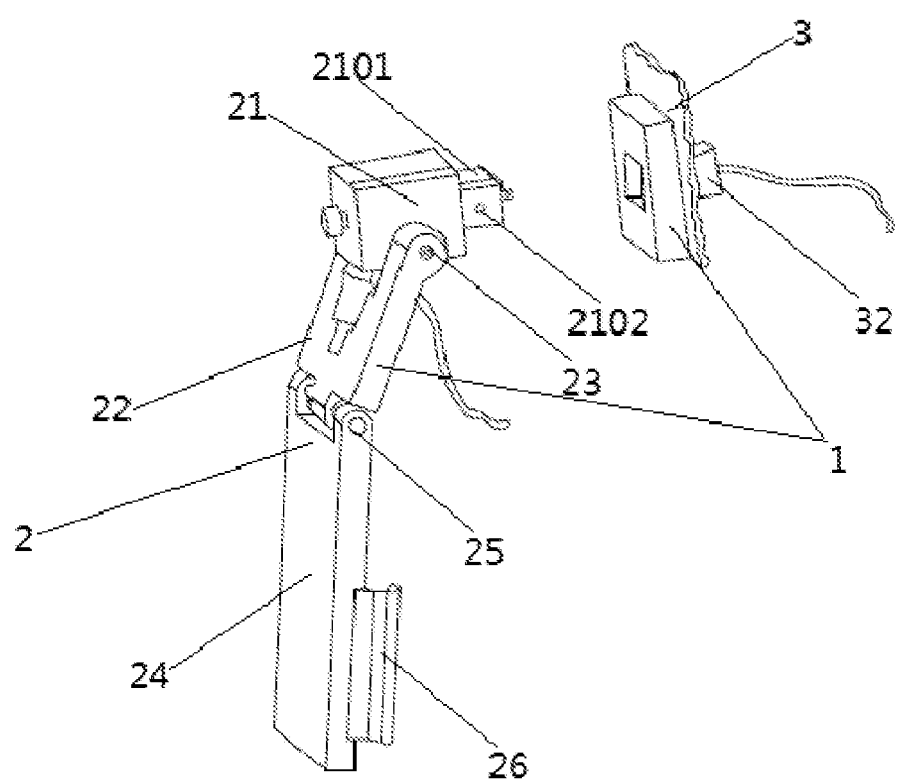
FIG. 3 is a schematic view of the mechanical structure of a safety helmet lock of the present invention.

Referring to FIG. 3, as a further improvement of the present invention, the safety helmet lock plug assembly 2 comprises a safety helmet lock plug 21, a first bracket 22, a first rotation shaft 23, a second bracket 24, and a second rotation shaft 25. The safety helmet lock plug 21 is connected with the first bracket 22 through the first rotation shaft 23. The first bracket 22 is rotatable about the first rotation shaft 23 but is not axially movable, and the first bracket 22 is connected with the second bracket 24 through the second rotation shaft 25. The second bracket 24 is rotatable about the second rotation shaft 25 between the shaft holes of the first bracket 22 and is axially movable between the shaft holes of the first bracket 22. The second bracket 24 is provided with a mobile phone clamp 26, and a mobile phone can be clamped and fixed on the mobile phone clamp 26. The second bracket 24 can be moved up and down and left and right through this design, such that the input and output data interface plug on the safety helmet lock plug can be aligned with and be inserted into the input and output data interface slot on the bottom end of the mobile phone fixed on the mobile phone clamp 26, thereby charging the mobile phone.

Figure 4:
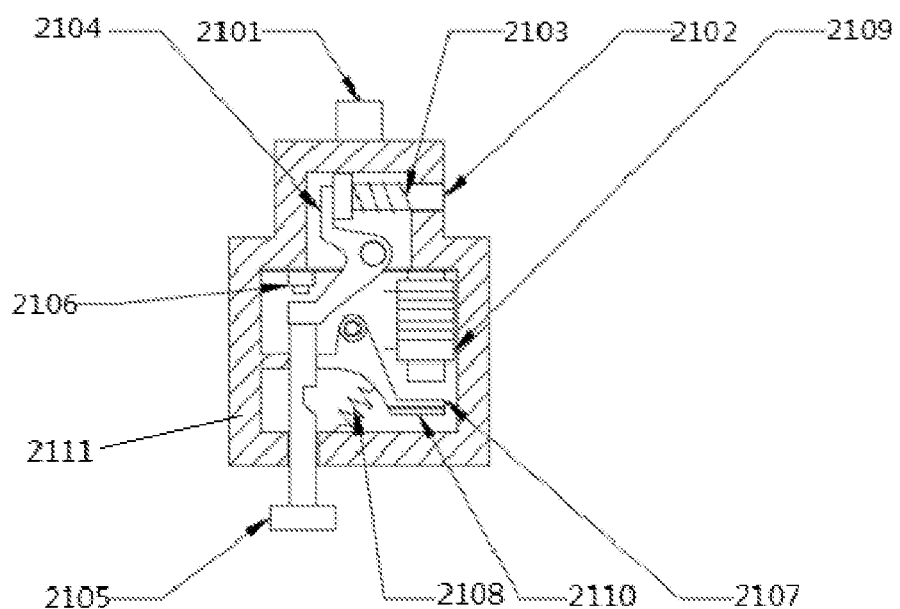
FIG. 4 is a schematic structural view of a safety helmet lock plug assembly of the present invention.

Referring to FIG. 4, as a further improvement of the present invention, the safety helmet lock plug 21 comprises an input and output data interface plug 2101, a locking pin 2102, a first spring 2103, a first lever 2104, an locking button 2105, a travel switch 2106, a second lever 2107, a second spring 2108, an electromagnet 2109, a ferromagnetic metal sheet 2110, and a shell 2111, the input and output data interface plug 2101 being provided on an upper end of the shell 2111, the shell 2111 being provided with a first insertion hole and a second insertion hole, the locking pin 2102 being movably provided inside the first insertion hole, the locking button 2105 being movably provided inside the second insertion hole, the first spring 2103 being sleeved on the locking pin 2102, one end of the first spring 2103 being fixed at one side of a cap of the locking pin 2102, the other end of the first spring 2103 being fixed on an inner wall of the shell 2111, a top of the cap of the locking pin 2102 being fixed at one end of the first lever 2104, the other end of the first lever 2104 being fixed at one end of the locking button 2105, the travel switch 2106 being fixed on the inner wall of the shell 2111 and is located directly above the locking button 2105. In natural state, the locking pin 2102 is retracted into the shell 2111, and the plane surface of an outer end of the locking pin 2102 is flush with or slightly lower than the outer plane surface of the locking body. When the locking button 2105 is pressed, the locking pin 2102 is extended outwards under the force through the first lever 2104. The locking button 2105 is provided with a notch, the electromagnet 2109 being fixed on the inner wall of the shell 2111, the ferromagnetic metal sheet 2110 being provided at one end of the second lever 2107 and is located directly below the electromagnet 2109, the other end of the second lever 2107 being fixed on the inner wall of the shell 2111, one end of the second spring 2108 being fixed on the inner wall of the shell 2111, the other end of the second spring 2108 being fixed on the second lever 2107. When the position of the notch moves to a designated position of one end of the second lever 2107, the other end of the second lever 2107 under the pulling force of the second spring 2108 causes one end of the second lever 2107 to fall into the notch, and the locking button 2105 is stuck, such that locking pin 2102 is kept in an extended state. When the electromagnet 2109 is energized, the magnetic field generated by the electromagnet 2109 attracts the ferromagnetic metal plate 2110 to rotate the second lever 2107 such that one end of the second lever 2107 moves out of the notch. Therefore, the locking pin 2102 returns to its original state and give feedbacks to the main control circuit of the electronic frame lock through the wire.

Figure 5:
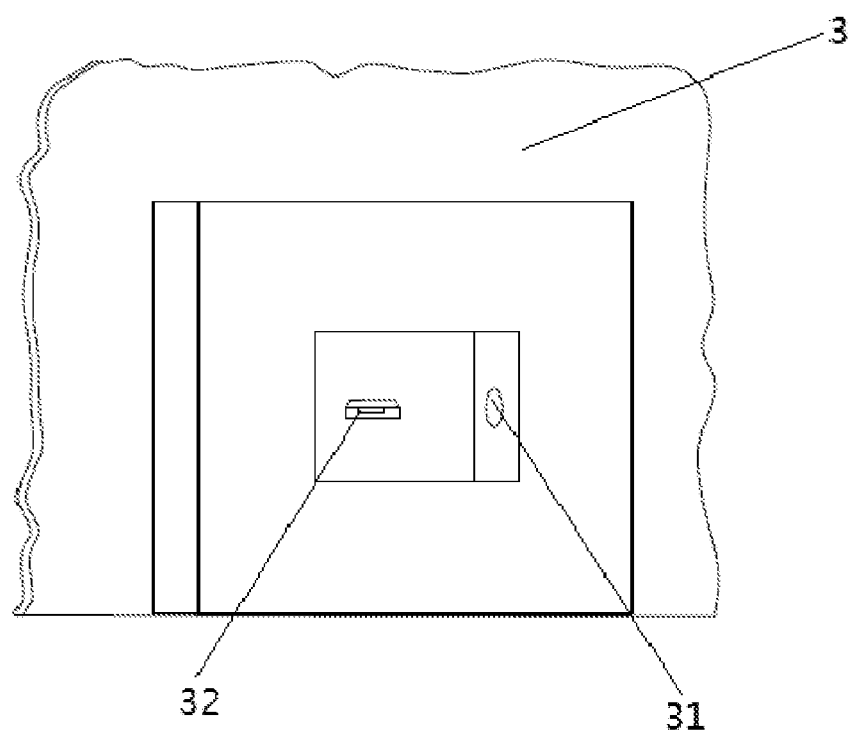
FIG. 5 is a partial structural view of a safety helmet lock slot of the present invention.

Referring to FIG. 5, as a further improvement of the present invention, the safety helmet lock slot 3 comprises a locking pin hole 31, an input and output data interface slot 32 provided on one side of the locking pin hole, and a built-in control circuit, the input and output data interface slot 32 being electrically connected with the built-in control circuit.

As a further improvement of the present invention, when the locking pin 2102 of the safety helmet lock plug 21 is inserted into the locking pin hole 31 of the safety helmet lock slot 3, and the input and output data interface plug 2101 is also inserted into the input and output data interface slot 32, and the input and output data interface plug 2101 is used in cooperation with the input and output data interface slot 32. When the locking pin 2102 extends out of the shell 2111 and into the locking pin hole 31, i.e., the intelligent safety helmet is locked on the shared bicycle.

The intelligent safety helmet is further provided with a film pressure sensor. When the intelligent safety helmet is removed from the helmet lock plug 21, the built-in voice prompt device prompts. When the user puts on the intelligent safety helmet, an action switch of the film pressure sensor in the intelligent safety helmet is triggered by the intelligent safety helmet's own weight, such that the voice prompt device is controlled by the control circuit on the intelligent safety helmet to stop the prompt. When the intelligent safety helmet is taken off, the action of the pressure sensor disappears such that the voice prompt device is controlled by the control circuit on the intelligent safety helmet to issue the prompt. After the intelligent safety helmet is inserted into the helmet lock plug, the main control circuit inside the electronic frame lock stops the voice prompt device inside the intelligent safety helmet from prompting through the input and output data interface. The input and output data interface may be a standard interface such as USB, micro USB, or type C and so on.

The rear end of the intelligent safety helmet is fixed on the handlebar of or the saddle of shared bicycle by the cooperation between the safety helmet lock plug assembly 2 and the safety helmet lock slot 3, and the front end of the handlebar of the shared bicycle is provided with a Y-shaped support frame. This is because that if the intelligent safety helmet and the shared bicycle have only one fixed point, the intelligent safety helmet will suffer from uneven force, which may easily damage the safety helmet lock. By designing the middle region of the handlebar of the shared bicycle with a Y shape, or directly using the Y-shaped structure of the saddle, the rear end of the intelligent safety helmet is fixed by the safety helmet lock plug 21, and there are two points at two front ends to support or to assist in fixing the front end of the intelligent safety helmet, such that the intelligent safety helmet has 3 supporting points stably fixed on the handlebar of or the saddle of the shared bicycle.

A brief working process of the method and the device provided by the present invention is as follows: in the parking state of the bicycle, the electronic frame lock and the helmet lock are interlocked, both of which share a built-in processor; after the user scans the two-dimensional code, and after the user's use authorization of the bicycle is approved through the remote communication, both the electronic frame lock and the helmet lock are unlocked and the voice prompt device on the intelligent safety helmet prompts, and the trip recording and the billing begin; when the user puts on the intelligent safety helmet, the switch is triggered to stop the prompting of the voice prompt device. If the user takes off the intelligent safety helmet halfway, then the voice device continues to prompt. After the using of the bicycle is terminated, the voice prompting device works. Only after the electronic frame lock and the helmet lock are locked by the user and both of them are reset, can the voice prompting device stop prompting, and the trip recording or the billing can be terminated.

The above description is merely preferred embodiments of the present invention and does not impose any limitation on the present invention. Any person skilled in the art may make use of the method and technical content disclosed above to make many possible changes and modifications to the technical solutions of the present invention without departing from the scope of the technical solutions of the present invention, or to modify the technical solutions of the present invention into equivalent implementations of equivalent changes. Therefore, all the equivalent changes made according to the shape, the structure and the principle of the present invention, without departing from the contents of technical solutions of the present invention, should be included within the protection scope of the present invention.

What is claimed:

1. An interlocking method for a shared bicycle and an intelligent safety helmet, comprising:
   (1) providing an electronic frame lock and the intelligent safety helmet which are used cooperatively on the shared bicycle respectively, and providing a processor and an electric lock inside the electronic frame lock; providing a safety helmet lock and a voice prompt device on the intelligent safety helmet; interlocking the electric lock with the intelligent safety helmet when the shared bicycle is parked;
   (2) when a user uses a mobile intelligent terminal to scan a two-dimensional code of the shared bicycle, establishing a communication link between the mobile intelligent terminal and the electronic frame lock and issuing an use authorization request by the mobile intelligent terminal, verifying an authorization request of the user by the processor inside the electronic frame lock through a network, and simultaneously checking a current state information of the electric lock and the safety helmet lock by the processor inside the electronic frame lock;
   (3) when a verification of the authorization request of the user is passed and when both the electronic frame lock and the safety helmet lock are in a locked state, issuing an instruction by the processor to unlock the electric lock and the safety helmet lock simultaneously;
   (4) after the safety helmet lock is unlocked, triggering the voice prompt device on the intelligent safety helmet to prompt the user in a form of voice broadcast that the intelligent safety helmet has been unlocked and to prompt the user in the form of voice broadcast to put on the intelligent safety helmet;
   (5) after the user puts on the intelligent safety helmet, triggering a voice prompt switch such that the voice prompting device stops a voice broadcast function, and the intelligent safety helmet begins to record a trip information;
   (6) after the user terminates the using of the bicycle, prompting the user by the voice prompt device in the intelligent safety helmet to lock the electronic frame lock and the safety helmet lock respectively, when the state information of the electronic frame lock and the safety helmet lock checked by the processor inside the electronic frame lock shows that the electronic frame lock and the safety helmet lock are locked, stopping the voice broadcast function and terminating the recording of the trip information.

2. The interlocking method for the shared bicycle and the intelligent safety helmet according to claim 1, wherein the step (3) further comprises the following steps:
   (3.1) when the electronic frame lock is locked and the safety helmet lock is unlocked, determining by the processor that the state information of the electronic frame lock and the safety helmet lock is in an abnormal state, issuing a language prompt by the voice prompt device to prompt the user to lock the safety helmet lock first, returning to step (2) to reissue the use authorization request;
   (3.2) when the electronic frame lock is unlocked and the safety helmet lock is locked, determining by the processor that the state information of the electronic frame lock and the safety helmet lock is in an abnormal state, issuing the language prompt by the voice prompt device to prompt the user to lock the electronic frame lock first, returning to step (2) to reissue the use authorization request;
   (3.3) when both the electronic frame lock and the safety helmet lock are unlocked, determining by the processor that the state information of the electronic frame lock and the safety helmet lock is in an abnormal state, issuing the language prompt by the voice prompt device to prompt the user to lock the safety helmet lock and electronic frame lock first, returning to step (2) to reissue the use authorization request.

3. The interlocking method for the shared bicycle and the intelligent safety helmet according to claim 1, wherein the step (4) further comprises the following steps: when the user takes off the intelligent safety helmet during the process of bicycling, retriggering the voice broadcast function of the voice prompt device and issuing a voice to prompt the user to put on the intelligent safety helmet when bicycling.

4. The interlocking method for the shared bicycle and the intelligent safety helmet according to claim 1, wherein the step (1) further comprises the following steps:
   (11) providing the intelligent safety helmet with a safety helmet lock plug assembly and a safety helmet lock slot; providing the intelligent safety helmet on a bicycle saddle, and fixing a rear end of the intelligent safety helmet on the bicycle saddle by a cooperation between the safety helmet lock plug assembly and the safety helmet lock slot; or
   (12) providing a Y-shaped support frame on a front end of a handlebar of and a rear end of the saddle of the shared bicycle, and fixing the rear end of the intelligent safety helmet on the handlebar of or the saddle of shared bicycle by the cooperation between the safety helmet lock plug assembly and the safety helmet lock slot.

5. An interlocking device for a shared bicycle and an intelligent safety helmet implementing the method according to claim 1, comprising:
   an electronic frame lock and the intelligent safety helmet which are respectively provided on the shared bicycle and used in cooperation with each other, a processor and an electric lock being provided inside the electronic frame lock;
   the intelligent safety helmet being used for interlocking with the bicycle and for protecting the safety of a user while bicycling, the intelligent safety helmet being provided with a safety helmet lock and a voice prompt device;
   the electric lock being used for locking the bicycle, an internal circuit of the electric lock being connected to the processor by the connection with an interior of a helmet lock plug;
   the electric lock and the safety helmet lock being interlocked when the shared bicycle is parked, and being unlocked simultaneously when the shared bicycle is used.

6. The interlocking device for the shared bicycle and the intelligent safety helmet according to claim 5, wherein the device further comprises a safety helmet lock slot provided on the shared bicycle and a safety helmet lock plug assembly provided on the intelligent safety helmet, the safety helmet lock slot and the safety helmet lock plug assembly being used in cooperation with the safety helmet lock for locking the intelligent safety helmet on the shared bicycle to prevent theft and for interlocking with the electric lock when the shared bicycle is parked.

7. The interlocking device for the shared bicycle and the intelligent safety helmet according to claim 6, wherein the safety helmet lock plug assembly comprises a safety helmet lock plug, a first bracket, a first rotation shaft, a second bracket and a second rotation shaft, the safety helmet lock plug being connected with the first bracket through the first rotation shaft, the first bracket being connected with the second bracket through the second rotation shaft, the safety helmet lock plug comprising an input and output data interface plug, a locking pin, a first spring, a first lever, a locking button, a travel switch, a second lever, a second spring, an electromagnet, a ferromagnetic metal sheet, and a shell, the input and output data interface plug being provided on an upper end of the shell, the shell being provided with a first insertion hole and a second insertion hole, the locking pin being movably provided inside the first insertion hole, the locking button being movably provided inside the second insertion hole, the first spring being sleeved on the locking pin, one end of the first spring being fixed at one side of a cap of the locking pin, the other end of the first spring being fixed on an inner wall of the shell, a top of the cap of the locking pin being fixed at one end of the first lever, the other end of the first lever being fixed at one end of the locking button, the travel switch being fixed on the inner wall of the shell and is located directly above the locking button, the locking button being provided with a notch, the electromagnet is fixed on the inner wall of the shell, the ferromagnetic metal sheet being provided at one end of the second lever and is located directly below the electromagnet, the other end of the second lever being fixed on the inner wall of the shell, one end of the second spring being fixed on the inner wall of the shell, the other end of the second spring being fixed on the second lever, the electromagnet being electrically connected with a main control circuit of the electronic frame lock through a wire.

8. The interlocking device for the shared bicycle and the intelligent safety helmet according to claim 6, wherein the safety helmet lock slot comprises a locking pin hole, an input and output data interface slot provided on one side of the locking pin hole, and a built-in control circuit, the input and output data interface slot being electrically connected with the built-in control circuit.

9. The interlocking device for the shared bicycle and the intelligent safety helmet according to claim 6, wherein the intelligent safety helmet is further provided with a film pressure sensor; wherein when the intelligent safety helmet is removed from the helmet lock plug, the built-in voice prompt device prompts; when the user puts on the intelligent safety helmet, an action switch of the film pressure sensor in the intelligent safety helmet is triggered by the intelligent safety helmet's own weight, such that the voice prompt device is controlled by the control circuit on the intelligent safety helmet to stop the prompt; when the intelligent safety helmet is taken off, the action of the pressure sensor disappears such that the voice prompt device is controlled by the control circuit on the intelligent safety helmet to issue the prompt; and after the intelligent safety helmet is inserted into the helmet lock plug, the main control circuit inside the electronic frame lock stops the voice prompt device inside the intelligent safety helmet from prompting through an input and output data interface.

10. The interlocking device for the shared bicycle and the intelligent safety helmet according to claim 6, wherein the intelligent safety helmet is provided on an bicycle saddle, a rear end of the intelligent safety helmet being fixed on the bicycle saddle by a cooperation between the safety helmet lock plug assembly and the safety helmet lock slot; or a front end of a handlebar of and a rear end of the saddle of the shared bicycle are provided with a Y-shaped support frame, and the rear end of the intelligent safety helmet is fixed on the handlebar of or the saddle of shared bicycle by the cooperation between the safety helmet lock plug assembly and the safety helmet lock slot; and the safety helmet lock plug assembly is electrically connected with the processor inside the electronic frame lock and a main control circuit of the electric lock through a wire or wireless communication, so as to achieve interlocking.

11. An interlocking device for a shared bicycle and an intelligent safety helmet implementing the method according to claim 2, comprising:

an electronic frame lock and the intelligent safety helmet which are respectively provided on the shared bicycle and used in cooperation with each other, a processor and an electric lock being provided inside the electronic frame lock;

the intelligent safety helmet being used for interlocking with the bicycle and for protecting the safety of a user while bicycling, the intelligent safety helmet being provided with a safety helmet lock and a voice prompt device;

the electric lock being used for locking the bicycle, an internal circuit of the electric lock being connected to the processor by the connection with an interior of a helmet lock plug;

the electric lock and the safety helmet lock being interlocked when the shared bicycle is parked, and being unlocked simultaneously when the shared bicycle is used.

12. An interlocking device for a shared bicycle and an intelligent safety helmet implementing the method according to claim 3, comprising:

an electronic frame lock and the intelligent safety helmet which are respectively provided on the shared bicycle and used in cooperation with each other, a processor and an electric lock being provided inside the electronic frame lock;

the intelligent safety helmet being used for interlocking with the bicycle and for protecting the safety of a user while bicycling, the intelligent safety helmet being provided with a safety helmet lock and a voice prompt device;

the electric lock being used for locking the bicycle, an internal circuit of the electric lock being connected to the processor by the connection with an interior of a helmet lock plug;

the electric lock and the safety helmet lock being interlocked when the shared bicycle is parked, and being unlocked simultaneously when the shared bicycle is used.

13. An interlocking device for a shared bicycle and an intelligent safety helmet implementing the method according to claim 4, comprising:

an electronic frame lock and the intelligent safety helmet which are respectively provided on the shared bicycle and used in cooperation with each other, a processor and an electric lock being provided inside the electronic frame lock;

the intelligent safety helmet being used for interlocking with the bicycle and for protecting the safety of a user while bicycling, the intelligent safety helmet being provided with a safety helmet lock and a voice prompt device;

the electric lock being used for locking the bicycle, an internal circuit of the electric lock being connected to the processor by the connection with an interior of a helmet lock plug;

the electric lock and the safety helmet lock being interlocked when the shared bicycle is parked, and being unlocked simultaneously when the shared bicycle is used.

\* \* \* \* \*